United States Patent
Zheng et al.

(10) Patent No.: US 12,024,894 B2
(45) Date of Patent: *Jul. 2, 2024

(54) SELF-SEALING ROOF FASTENER

(71) Applicant: BMIC LLC, Dallas, TX (US)

(72) Inventors: Yan Zheng, Livingston, NJ (US); Adem Chich, Kearny, NJ (US)

(73) Assignee: BMIC LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/896,674

(22) Filed: Aug. 26, 2022

(65) Prior Publication Data
US 2023/0243155 A1 Aug. 3, 2023

Related U.S. Application Data

(63) Continuation of application No. 17/030,956, filed on Sep. 24, 2020, now Pat. No. 11,428,009.

(60) Provisional application No. 62/907,996, filed on Sep. 30, 2019.

(51) Int. Cl.
*E04D 5/14* (2006.01)
*E04D 3/36* (2006.01)
*F16B 43/00* (2006.01)

(52) U.S. Cl.
CPC ........... *E04D 5/145* (2013.01); *E04D 3/3606* (2013.01); *F16B 43/001* (2013.01)

(58) Field of Classification Search
CPC ..... E04D 5/145; E04D 3/3606; F16B 43/001; F16B 5/02; F16B 5/128; F16B 25/0015; F16B 25/0089; F16B 25/0094; F16B 11/006; F16B 33/004
See application file for complete search history.

(56) References Cited

U.S. PATENT DOCUMENTS

| | | | |
|---|---|---|---|
| 2,616,283 A | 11/1952 | Branstrator et al. |
| 2,666,354 A | 1/1954 | Dim et al. |
| 3,750,523 A | 8/1973 | Fujita |
| 4,442,148 A | 4/1984 | Stierli |
| 5,082,412 A | 1/1992 | Thomas |
| 5,304,023 A | 4/1994 | Toback et al. |
| 5,472,241 A | 12/1995 | Kosik, Jr. et al. |

(Continued)

FOREIGN PATENT DOCUMENTS

| | | |
|---|---|---|
| CN | 109563867 B | 1/2021 |
| DE | 2855743 A1 | 7/1980 |

(Continued)

OTHER PUBLICATIONS

EBAY; https://www.ebay.com/itm/4-4-Solar-Self-Seal-Roof-Mounting-Brackets-Unistrut-Superstrut-Rail-standoffs-/151271225082; 4) 4+ Solar Self Seal Roof Mounting Brackets Unistrut/Superstrut Rail Standoffs; available prior to Sep. 30, 2019.

*Primary Examiner* — Patrick J Maestri
(74) *Attorney, Agent, or Firm* — Womble Bond Dickinson (US) LLP

(57) ABSTRACT

A self-sealing fastener for installation of roofing materials for creating a substantially watertight seal around fastener penetrations where roofing materials or panels are affixed to an underlying roof deck by the fasteners. Also disclosed is a method for installing the self-sealing fastener for attachment of roofing materials to an underlying roof deck with the penetrations areas or holes created by the fasteners being substantially sealed against water penetration.

19 Claims, 2 Drawing Sheets

(56) References Cited

U.S. PATENT DOCUMENTS

| | | |
|---|---|---|
| 5,647,178 A | 7/1997 | Cline |
| 5,784,846 A | 7/1998 | Godschalx |
| 5,786,085 A | 7/1998 | Tzeng et al. |
| 5,873,201 A | 2/1999 | Fey |
| 5,979,133 A | 11/1999 | Funkhouser |
| 6,228,785 B1 | 5/2001 | Miller et al. |
| 6,282,858 B1 | 9/2001 | Swick |
| 6,341,462 B2 | 1/2002 | Kiik et al. |
| 6,536,729 B1 | 3/2003 | Haddock |
| 6,709,994 B2 | 3/2004 | Miller et al. |
| 6,773,791 B1 | 8/2004 | Ruggie et al. |
| D501,052 S | 1/2005 | Yang et al. |
| 7,132,151 B2 | 11/2006 | Rasmussen |
| 7,329,077 B2 | 2/2008 | Curtis |
| 7,685,785 B2 | 3/2010 | Johnson |
| 7,833,338 B2 | 11/2010 | Whitaker et al. |
| 8,266,861 B2 | 9/2012 | Koch et al. |
| 8,424,821 B2 | 4/2013 | Liu |
| 8,689,517 B2 | 4/2014 | Schaefer et al. |
| 8,920,088 B1 | 12/2014 | Garvin |
| 9,010,058 B2 | 4/2015 | DeJarnette et al. |
| 9,912,284 B2 * | 3/2018 | Svec .................. E04D 13/0404 |
| 9,995,333 B2 | 6/2018 | McPheeters |
| 10,291,176 B2 | 5/2019 | Wentworth et al. |
| 11,085,189 B2 | 8/2021 | Zheng et al. |
| 11,428,009 B2 | 8/2022 | Zheng et al. |
| 2002/0032000 A1 | 3/2002 | Lawless, III et al. |
| 2002/0076525 A1 | 6/2002 | Fensel et al. |
| 2002/0078651 A1 | 6/2002 | Freshwater et al. |
| 2007/0079865 A1 | 4/2007 | Warfield et al. |
| 2011/0223410 A1 | 9/2011 | Gencer et al. |
| 2012/0138570 A1 | 6/2012 | Millward et al. |
| 2012/0186722 A1 | 7/2012 | Lennox et al. |
| 2012/0266559 A1 | 10/2012 | Thies, III |
| 2013/0025224 A1 | 1/2013 | Vermilion et al. |
| 2014/0349072 A1 | 11/2014 | Hong et al. |
| 2015/0047285 A1 | 2/2015 | Dejarnette et al. |
| 2015/0082722 A1 | 3/2015 | Kalkanoglu et al. |
| 2016/0333591 A1 | 11/2016 | Polumbus |
| 2018/0087558 A1 | 3/2018 | Feldmann et al. |
| 2018/0320368 A1 | 11/2018 | Gonzales et al. |
| 2019/0301509 A1 | 10/2019 | Philip |

FOREIGN PATENT DOCUMENTS

| | | |
|---|---|---|
| EP | 1002681 A2 | 5/2000 |
| EP | 26626646 A1 | 11/2013 |
| WO | WO2012/153246 A1 | 11/2012 |

* cited by examiner

SELF-SEALING ROOF FASTENER

REFERENCE TO RELATED APPLICATIONS

The present Patent Application is a continuation of previously filed, co-pending U.S. patent application Ser. No. 17/030,956, filed Sep. 24, 2020, which claims the benefit of U.S. Provisional Application No. 62/907,996 filed on Sep. 30, 2019.

INCORPORATION BY REFERENCE

U.S. patent application Ser. No. 17/030,956, filed Sep. 24, 2020, U.S. Provisional Patent Application No. 62/907,996, filed Sep. 30, 2019, are specifically incorporated by reference herein as if set forth in their entireties.

TECHNICAL FIELD

The present disclosure generally relates to fasteners for installation of roofing panels and/or other roofing materials, and more specifically, to self-sealing fasteners that release a sealing material to seal the penetration areas about the fasteners against penetration of moisture.

BACKGROUND

The construction of roofs generally requires fasteners to be driven through roofing materials, including roofing panels, roof membranes or liners and into a supporting decking. Installation of such fasteners consequently creates penetrations through the roofing materials at the locations where the fasteners are driven therethrough. Most roofing membranes or liners will resist water penetration except at the holes or penetration sites created by the fasteners, which holes enable water to migrate through the roofing materials and can pool and collect beneath the roof panels and decking. Such pooling or collection of water in turn can cause mildew, warping and rotting of the roof deck. Coatings or other, similar adhesive materials, such as petroleum tar, have been used in the past to coat and seal the roofing materials at such holes or penetrations. However, application of such sealing materials generally requires additional labor with such sealing materials generally being applied manually, which can also lead to inconsistent application of the sealing materials and/or excess or waste of the materials during application.

Accordingly, it can be seen that a need exists for a self-sealing fastener for installation of roofing materials that addresses the foregoing and other related and unrelated problems in the art.

SUMMARY

A self-sealing roofing fastener design is provided. The self-sealing roofing fastener, in one embodiment, includes a fastener plate having a fastener, such as a screw, nail or other, similar fastener. The fastener plate will include a fastener cap defining an opening through which the fastener can be received, and a sealant material. The sealant material can be contained within a pocket or encapsulate structure that can be mounted below the fastener cap. For example, the sealant encapsulate structure generally will be located between a roofing panel or roof membrane or liner and the fastener cap. The sealant encapsulate structure can be of various different sizes and/or configurations, and, in some embodiments, can be positioned or selectively located and installed beneath the fastener cap separately from the fastener cap.

As the fastener is engaged and driven through the opening of the fastener cap, it will pierce the pocket or the sealant encapsulate structure, releasing the sealant material. The sealant material generally will spread and/or flow within the space beneath the fastener cap, including flowing into the hole or penetration opening created by the fastener as it penetrates through the roofing panel or roof membrane or liner and into the roof deck.

In one embodiment, the sealant material can include an adhesive or other, similar sealing material in the form of a liquid or gel that will easily spread or flow when released, and will be substantially fast-curing. In other embodiments, the sealant material can include multiple sealing materials such as, for example, a cross-linking sealant system having a reactive component material and a catalyst component material that react when mixed to create a substantially water-tight seal about the fastener and penetration opening or hole.

In another aspect of the present disclosure, an agitation or stirring mechanism, or other, similar device configured to engage and facilitate the spreading of the sealant material also can be provided. The agitation mechanism generally will be arranged below the fastener cap in a position to be engaged by the fastener and urged into contact with the sealant material to help spread or urge the sealant material within the space under the fastener cap and into the penetration opening. In addition, spacers also can be provided to support the sealant encapsulate structure in a position spaced above the roofing deck.

The foregoing and various other features, aspects and advantages of the present disclosure will be further understood upon a review the following detailed description, when taken in conjunction with the accompanying drawings.

BRIEF DESCRIPTION OF THE DRAWINGS

It will be appreciated that for simplicity and clarity of illustration, elements illustrated in the figures are not necessarily drawn to scale. For example, the dimensions of some elements may be exaggerated relative to other elements. As those skilled in the art also will appreciate and understand, the dimensions of various features and elements of the drawings may be expanded and/or reduced to more clearly illustrate the embodiments of the present disclosure as described herein. Accordingly, embodiments incorporating the teachings of the present disclosure are shown and described below with respect to the drawings, in which.

DETAILED DESCRIPTION

Figure 1:
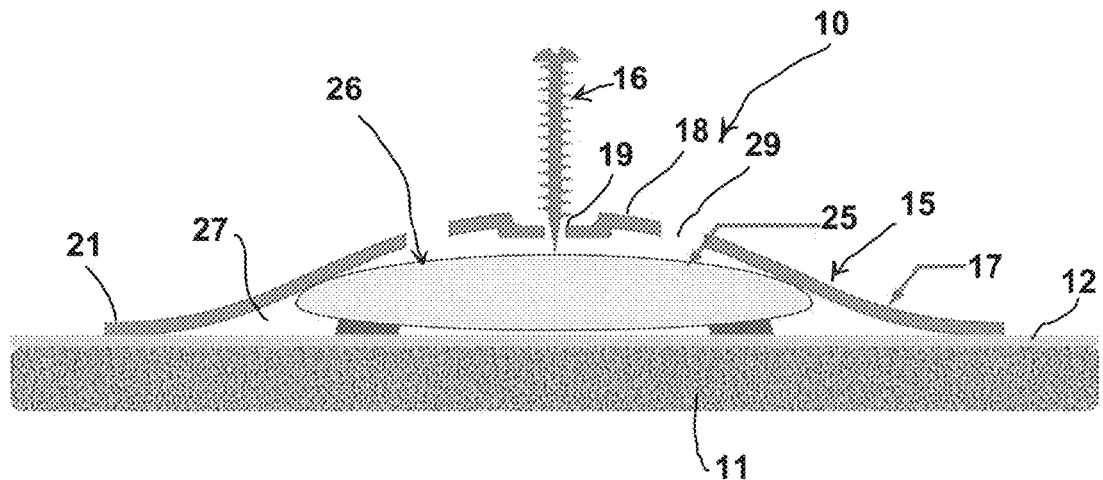
FIG. 1 is a side elevational view of the embodiment of a self-sealing roofing fastener design that embodies and exemplifies the principles of the present disclosure.

The following description taken in combination with the accompanying drawing figures is provided to assist in the understanding of the teachings disclosed herein. The description is focused on implementations and embodiments of the present disclosure, and is provided to assist in describing such teachings. The focus should not be interpreted as a limitation on the scope or applicability of the present disclosure.

Referring now to the drawings in which like numerals indicate like parts throughout the several views, FIGS. 1-4 illustrate embodiments of a self-sealing roof fastener 10 for the installation of roofing panels or other roofing materials onto a supporting roof decking 11. As further illustrated in FIGS. 1-4, a roof panel 12 generally will be applied over an upper surface of the roof deck 11. The roof panel 12 can comprise various types of roofing materials, including a substantially watertight roof membrane or liner. In addition, the self-sealing fastener can be used with various other roofing materials and/or roofing accessories, such as solar panels, repair patches, flashing materials, etc. As a further alternative, an additional watertight roof membrane or liner also can be applied between the roof panel 12 and the upper surface of the roof deck 11.

The self-sealing roof fastener 10 can be located on top of the roof panel 12, with a series of self-sealing roof fasteners generally being arranged at spaced locations along each roof panel. As generally illustrated in FIG. 1, the self-sealing roof fastener 10, in one embodiment, will include a fastener plate 15 having a fastener 16, such as a screw, nail or other, similar fastener. The fastener plate 15 further will include a fastener cap or body 17 that can have a central portion 18 defining an opening 19 through which the fastener 16 is received, and also can include and outwardly flaring peripheral portion 21. The fastener cap further can be formed from various weather-resistant materials, including various metals and/or plastic, synthetic or composite materials.

Figure 3:
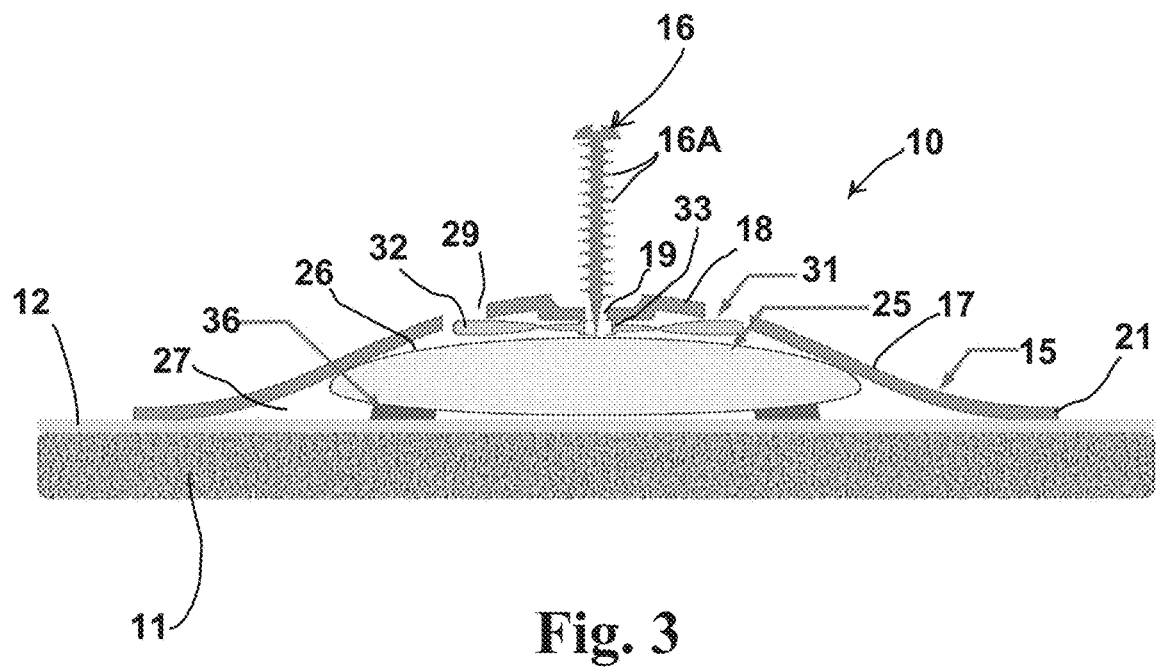
FIG. 3 is a side elevational view of an additional embodiment of a self-sealing fastener design that embodies and exemplifies the principles of the present disclosure.

A sealant material 25 will be enclosed or encapsulated within a pocket, packet or other encapsulate structure 26 that is mounted below the fastener cap. Typically, the sealant encapsulate structure or pocket will be located below a lower surface of the fastener cap, for example, being arranged between an upper surface of the roof panel 12 and the lower surface of the fastener cap, such as generally illustrated in FIGS. 1 and 3. The sealant encapsulate structure or pocket can include a thin film material that will be easily punctured, but has sufficient strength to maintain the sealant material therein and protect it from exposure to the surrounding environment until punctured by the fastener 16. The sealant encapsulate structure or pocket can be formed from various materials, including various plastics such as polypropylene (PP), polyethylene (PE), polyethylene terephthalate (PET), etc. and/or a metallized plastic materials. Other protective materials adapted to protect the sealant material from expense, while being easily pierced and separable by engagement of the fastener therewith also can be used.

The sealant material contained within the sealant encapsulate generally can include an adhesive or other known roofing sealant material that will be provided in a liquid or gel form within the sealant encapsulate. The sealant material further generally can include a fast-drying or fast-curing adhesive or sealant that, upon initially being released from the encapsulate, can flow or spread as needed to substantially cover and seal the space 27 beneath the fastener cap, as well as flowing into and substantially sealing the penetration hole 28 (FIG. 2) created by the penetration of the fastener through the roofing panel 12 and into the roofing deck 11, but will cure and set to form a substantially water-tight seal within a short period of time. For example, the sealant material can be formed of various materials, including a single component or 1K coating or sealant material such as Unisil HS silicone coating available from GAF of Parsippany, NJ, a Unisil silicone flashing available from GAF of Parsippany, NJ, an Elastuff® polyurethane coating materials available from GAF of Parsippany, NJ, United PMMA flashing available from GAF of Parsippany, NJ, epoxy sealants, and/or addition cure silicone sealants. Other sealant materials including two-component sealants or adhesives, also can be used. Once released, the sealant material generally will transform into a more viscose format as it cures, dries or by cross-linking, coalescence or other physical/chemical process.

In an additional embodiment, multiple sealant materials can be used, for example, being separated into and enclosed within multiple chambers of the encapsulate or packet. For example, the sealant material can comprise a two-part cross-linking system with a reactant material stored in a first chamber and a catalyst material stored in a secondary chamber within the sealant encapsulate or packet, with both being released upon engagement and penetration through the sealant encapsulate by the fastener.

As a further alternative, the separate adhesive or sealant materials each can be enclosed within their own sealant encapsulate or packet; e.g. a first sealant encapsulate with a first sealant material therein can be placed adjacent or on top of a second sealant encapsulate having a second sealant material therein. As the fastener penetrates the sealant encapsulates, the sealant materials can flow and mix together, creating a reaction which causes the mixed or combined sealant materials to cure upon flowing into and throughout the space below the fastener cap and into any penetration holes or openings created by the fastener to form a substantially watertight seal. By way of example, two component or 2K sealant materials can be used, including 2K adhesive or sealant systems such as Elastuff® Urethane coatings, M-Thane™ two part urethane sealants or LRF polyurethane foam adhesives, available from GAF of Parsippany, NJ., United Coatings™ PMMA flashing resin available from GAF of Parsippany, NJ, as well as various epoxy sealants, and/or addition cure 2K silicone sealants. Other sealant or adhesive materials also can be used.

Figure 2:
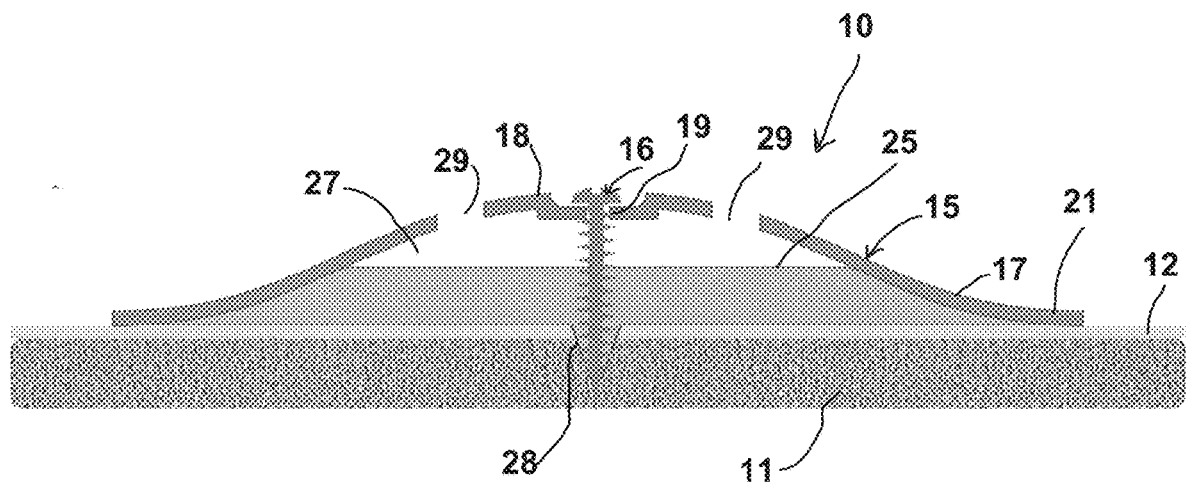
FIG. 2 is a side elevational view of the self-sealing fastener design of FIG. 1 showing the engagement of the fastener and release of the sealant encapsulate material.

FIG. 2 generally illustrates the self-sealing roof fastener design following engagement and driving of the fastener 16 through the roofing panel 12 and into the roof deck 11. As the fastener is driven into and through the sealant encapsulate, the sealant encapsulate is pierced, releasing the sealant material which will flow into and throughout the space 27 below the fastener cap, as well as flowing into the penetration area or hole 28 created by the fastener penetrating through the roof panel 12 and into the roof deck 11. In addition, as the fastener is driven downwardly, it will tend to force the roof cap further downwardly and into contact with the sealant encapsulate and sealant material such that the sealant material further can be urged or forced under pressure from the fastener cap to cause the sealant material to further flow and/or be extruded throughout the space beneath the fastener cap and into the penetration hole or area defined within the roof panel and roof deck as illustrated in FIG. 2.

The released sealant material accordingly generally will be confined within the fastener cap and contained within the space below the fastener cap and by the center plate and periphery thereof. Further, the use and location of the sealant encapsulate enables a substantially consistent placement of a desired/measured amount of sealant material to be directed through and around the penetration hole or opening created by the fastener to help ensure the penetration hole is sealed and to avoid excess or waste of sealant materials during application. The amount of sealant material included can be determined according to the size of the fastener cap (e.g., the area under the fastener cap to be covered by the sealant material) and a desired thickness of the sealant material to form a watertight seal on the roof panel and about the fastener. In some applications, the volume of sealant material can range from 1 mL to 50 mL, though any other suitable volume, including greater or lesser volumes, also can be used. For example, in some applications, the volume of sealant material can range from 1 mL to 40 mL, about 1 mL to 30 mL, 1 mL to 20 mL, or about 1 mL to 10 mL. In other embodiments, the volume of sealant can range from 5 mL to 50 mL, 5 mL to 45 mL, 5 mL to 35 mL, 5 mL to 25 mL, 5 mL to 15 mL, or 5 mL to 10 mL. In still other applications, the volume of sealant material can range from 10 mL to 50 mL, 10 mL to 40 mL, 10 mL to 30 mL, or 10 mL to 20 mL. In addition, the fastener cap further can be provided with openings or passages, as indicated at 29, to facilitate the passage of air through the fastener cap and into contact with the sealant material to promote the drying and moisture curing process of the sealant material.

FIG. 3 illustrates an additional embodiment of the self-sealing roof fastener 10. In this embodiment, an agitator or stirring mechanism or device 31 can be provided adjacent the sealant encapsulate. The agitator 31 can, in one embodiment, include two or more laterally projecting arms or paddles 32 projecting radially from a central hub 33, although additional or fewer paddles also can be used. As the fastener penetrates through the fastener cap and into the sealant encapsulate, as indicated in FIG. 3, the threads 16A of the fastener 16 can engage the hub 33 of the agitator 31 and cause it to engage the sealant encapsulate and/or sealant material. For example, the agitator 31 can be caused to spin or otherwise move by the engagement of the threads 16A of the fastener 16 therewith, such that as the fastener is rotated, its threads in turn will cause rotation of the agitator so as to likewise move and apply a stirring action or pressure to help spread the sealant material within the cavity 27 located beneath the fastener cap. In addition, or as a further alternative, the agitator can urge or press downwardly on the sealant encapsulate with the movement of the fastener 16 therethrough, which can help break and/or squeeze the sealant encapsulate to further facilitate the spreading of the sealant material throughout the cavity 27 under the fastener cap and into the penetration hole 28 (FIG. 2) created by the fastener.

In addition, as also shown in FIG. 3, spacers 36 further can be provided. The spacers can support the sealant encapsulate on top of the roof panel 12, i.e., with the sealant encapsulate being slightly raised above the roof panel 12. The spacers 36 can be sized and shaped in order to fit within the space 27 of the fastener plate 15. For example, the spacers 36 can have a radius of ¼ inch to 3 inches, ½ inch to 2½ inches, ¾ inch to 2 inches, 1 inch to 1½ inches, or any other suitable radius. The height of the spacers further can be 1/16 inch to 1 inch, ¼ inch to 1 inch, ½ inch to ¾ inch, or any suitable height based upon the size and shape/configuration of the space 27. The spacers can help support the sealant encapsulate during penetration by the fastener, and can help prevent residue or other portions from the broken sealant encapsulate from interfering with the flowing or spreading of the sealant material into the penetration opening or hole created by the fastener.

Figure 4:
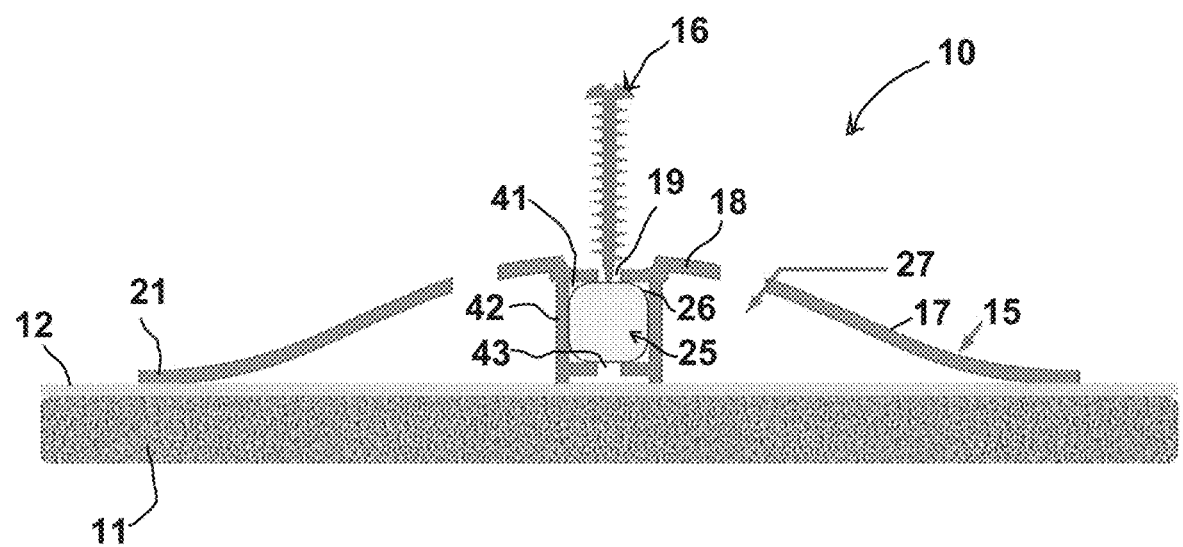
FIG. 4 is a side elevational view illustrating still a further embodiment of a self-sealing roofing fastener design that embodies and exemplifies the principles of the present disclosure.

In other embodiments, such as illustrated in FIG. 4, the sealant encapsulate can be provided in varying configurations, including being confined within a subspace 41 defined within a support structure 42 of the fastener cap 15. In such an embodiment, the sealant material can be further confined so that as it is released from the sealant encapsulate by the fastener, the sealant material is directed downwardly, e.g. though a port or opening 43 in the support structure 42, toward and into the penetration opening or hole created by the penetration of the fastener through the roof panel and roof deck, and can be substantially contained and restricted from spreading or flowing away from the penetration hole or opening.

The self-sealing roof fastener of the present disclosure has been described above in terms of preferred embodiments and constructions. It will be understood by the skilled artisan, however, that a wide range of additions, deletions and modifications can be made to the disclosed example embodiments without departing from the spirit and scope of the subject matter disclosed herein. Accordingly, all such modifications are intended to be included within the scope of the present disclosure.

The invention claimed is:

1. A fastening system, comprising:
a fastener;
a fastener cap having an opening defined therethrough, wherein the opening is configured to receive the fastener therethrough;
wherein the fastener cap comprises a central portion and an outwardly flaring peripheral portion surrounding the central portion;
wherein the opening of the fastener cap is formed through the central portion; and
a sealant material positioned within a space defined below the fastener cap;
wherein the sealant material is adapted to disperse along the fastener plate space below the fastener cap so as to substantially cover and seal the space defined below the fastener cap when the fastener is received through the opening defined in the fastener cap;
wherein the fastener cap is configured to move into contact with the sealant material as the fastener is received through the opening so as to urge the sealant material under pressure from the fastener cap to flow about the space defined below the fastener cap and toward the peripheral portion.

2. The fastening system of claim 1, further comprising an encapsulate structure configured to contain at least a portion of the sealant material.

3. The fastening system of claim 2, wherein the encapsulate structure comprises a film material adapted to contain and protect the sealant material from exposure to a surrounding environment until the encapsulate structure is pierced by the fastener.

4. The fastening system of claim 1, wherein the sealant material comprises a liquid or gel adhesive.

5. The fastening system of claim 1, wherein the sealant material comprises a first sealant, and further at least a second sealant positioned within the space, and wherein the first and second sealants are mixed together when the fastener is received through the opening.

6. The fastening system of claim 5, wherein the first sealant is contained within a first encapsulate structure and the second sealant is contained within a second encapsulate structure, and wherein each of the first encapsulate structure and the second encapsulate structure is adapted to be pierced by the fastener when the fastener is received in the opening to thereby release and facilitate mixing of the first sealant and the second sealant within the space.

7. The fastening system of claim 1, wherein the sealant material comprises a reactive component material, and a catalyst component material, wherein the reactive component material and the catalyst component material are adapted to react when mixed to at least partially cure and create a substantially water-tight seal about the fastener when the fastener is received through the fastener cap.

8. The fastening system of claim 1, wherein the fastener cap further comprises, at least one passage defined therethrough, and adapted to facilitate passage of air through the fastener cap and into contact with the sealant material to promote curing of the sealant material.

9. The fastening system of claim 1, wherein the sealant material comprises a liquid or gel; and wherein the fastener cap is adapted to contact the sealant material, as the fastener is inserted through the fastener cap, causing the sealant material to spread within the space defined below the fastener cap.

10. A roofing system comprising:
a plurality of roof panels;
a plurality of self-sealing fasteners positioned on each roof panel, each self-sealing fastener comprising,
a fastener plate including a fastener and a fastener cap having an opening configured to receive the fastener therethrough; and
a sealant material positioned within a space defined between the fastener plate and the roof panel, wherein the sealant material is dispersed along the roof panel;
wherein the fastener cap further comprises a central portion and an outwardly flaring peripheral portion surrounding the central portion;
wherein the opening of the fastener cap is formed through the central portion; and
wherein the fastener cap is configured to move into contact with the sealant material as the fastener is received through the opening so as to urge the sealant material under pressure from the fastener cap to flow throughout the space defined below the fastener cap, toward the peripheral portion and at least partially into a penetration hole at least partially formed in the roof panel when the fastener penetrates the roof panel.

11. The roofing system of claim 10, further comprising an encapsulate structure positioned between the fastener cap and the roof panel, wherein the encapsulate structure is configured to contain the sealant material; and wherein the encapsulate structure is adapted to be pierced by the fastener when the fastener is received through the opening to thereby release the sealant material from the encapsulate structure into the space, and at least partially into the penetration hole at least partially formed in the roof panel.

12. The roofing system of claim 10, further comprising a film or sheet material configured to contain and protect the sealant material from exposure to a surrounding environment until the film or sheet is pierced by the fastener.

13. The roofing system of claim 10, wherein the sealant material is in the form of a liquid or gel adhesive or sealant that is adapted to spread or flow when the fastener cap is urged toward the roof panel by the fastener.

14. The roofing system of claim 10, wherein the sealant material comprises a first sealant, and at least a second sealant received within the space, and wherein the first and second sealants are mixed together when the fastener is received through the opening and penetrates the roof panel.

15. The roofing system of claim 10, wherein the fastener cap further comprises at least one passage defined between the central portion and the peripheral portion of the fastener cap and configured to facilitate passage of air through the fastener cap and into contact with the sealant material to promote curing of the sealant material.

16. The roofing system of claim 10, further comprising an agitator positioned in the space, the agitator comprising a paddle projecting radially from a central hub, and wherein the fastener is adapted to engage the central hub of the agitator and cause the agitator to engage and stir the sealant material within the space.

17. The roofing system of claim 10, further comprising at least one spacer extending on the roof panel and supporting the sealant material above the roof panel in the space, with at least a portion of the sealant material positioned between the at least one spacer and the fastener cap.

18. The fastening system of claim 1, wherein the fastener cap further comprises at least one passage defined between the central portion and the peripheral portion of the fastener cap and configured to facilitate passage of air through the fastener cap and into contact with the sealant material to promote curing of the sealant material.

19. A fastening system, comprising:
a fastener;
a fastener cap having an opening, wherein the opening is configured to receive the fastener therethrough;
a sealant material positioned within a space defined below the fastener cap; and
an agitator positioned in the space defined below the fastener cap, the agitator comprising a paddle projecting radially from a central hub;
wherein the fastener is adapted to engage the central hub of the agitator and cause the agitator to engage and stir the sealant material within to disperse the sealant material within the space defined below the fastener plate cap when the fastener is received through the opening defined in the fastener cap.

* * * * *